(12) United States Patent
Tocchi et al.

(10) Patent No.: US 7,677,358 B2
(45) Date of Patent: Mar. 16, 2010

(54) SEALED THIN-MULTI-LAYER SOUND ABSORBER

(75) Inventors: Gabriele Tocchi, Sesto San Giovanni (IT); Phillippe Pierre Godano, Winterthur (CH); Bertrand Francois Delmas, Meulan (FR); Jan Horak, Winterthur (CH); Tommy Goran Falk, Freienstein (CH); Karim Bouteraa, Jambville (FR); Alexander Wildhaber, Walenstadt (CH)

(73) Assignee: Rieter Technologies, AG, Winterthur (CH)

( * ) Notice: Subject to any disclaimer, the term of this patent is extended or adjusted under 35 U.S.C. 154(b) by 0 days.

(21) Appl. No.: 11/910,641

(22) PCT Filed: Apr. 4, 2006

(86) PCT No.: PCT/EP2006/003056

§ 371 (c)(1),
(2), (4) Date: Apr. 22, 2008

(87) PCT Pub. No.: WO2006/105933

PCT Pub. Date: Oct. 12, 2006

(65) Prior Publication Data

US 2008/0257641 A1    Oct. 23, 2008

(30) Foreign Application Priority Data

Apr. 4, 2005    (EP) .................................. 05007279

(51) Int. Cl.
*F02B 77/13* (2006.01)
*E04B 1/82* (2006.01)
*E04B 1/84* (2006.01)
*E04B 2/02* (2006.01)
*F02B 77/11* (2006.01)
*E04B 1/74* (2006.01)

(52) U.S. Cl. ...................... 181/290; 181/286; 181/204; 296/39.3

(58) Field of Classification Search ................. 181/290, 181/291, 294, 286, 204, 205, 296; 296/39.3; 180/69.22, 69.23
See application file for complete search history.

(56) References Cited

U.S. PATENT DOCUMENTS

| 4,463,049 | A | * | 7/1984 | Kracke | ....................... 442/120 |
| 4,504,346 | A | * | 3/1985 | Newsam | ...................... 156/242 |
| 4,966,799 | A | * | 10/1990 | Lucca et al. | .................. 428/95 |
| 5,280,960 | A | * | 1/1994 | Casey | ......................... 280/848 |

(Continued)

FOREIGN PATENT DOCUMENTS

DE    3215244 A1 * 10/1983

(Continued)

*Primary Examiner*—Edgardo San Martin
(74) *Attorney, Agent, or Firm*—Dority & Manning, P.A.

(57) ABSTRACT

The invention relates to a thin sound absorbing multi-layer assembly, which is intended, in particular, to reduce interior or exterior noise of a motor vehicle. The assembly according to the invention comprises at least three stacked layers consisting respectively of: a first layer (4) being impervious and having an area weight of between (20) to (100 g/m2); a second layer (3) having an air flow resistance of between (250) to (2500 Ns/m3) and an area weight of between (15) to (250 g/m2); a third layer (2) being an open pored, acoustic spring type layer having a thickness of between (2) to (30 mm) and an area weight of between (50) to (1000 g/m2).

22 Claims, 5 Drawing Sheets

U.S. PATENT DOCUMENTS

| | | | |
|---|---|---|---|
| 5,767,024 A * | 6/1998 | Anderson et al. | 442/378 |
| 6,102,465 A * | 8/2000 | Nemoto et al. | 296/39.3 |
| 6,237,717 B1 * | 5/2001 | Osanai et al. | 181/294 |
| 6,267,838 B1 * | 7/2001 | Saugnac et al. | 156/320 |
| 6,302,466 B1 * | 10/2001 | Zwick | 296/39.3 |
| 6,641,194 B2 * | 11/2003 | Fujii et al. | 296/39.3 |
| 6,720,068 B1 * | 4/2004 | Vanbemmel et al. | 428/317.9 |
| 6,749,929 B1 * | 6/2004 | Enkler et al. | 428/304.4 |
| 6,953,205 B2 * | 10/2005 | Friest et al. | 280/770 |
| 6,983,822 B2 * | 1/2006 | O'Regan et al. | 181/290 |
| 7,402,537 B1 * | 7/2008 | Lenda et al. | 442/50 |
| 7,419,188 B2 * | 9/2008 | Nicolai et al. | 296/198 |
| 7,448,468 B2 * | 11/2008 | Czerny et al. | 181/210 |
| 2003/0062738 A1 | 4/2003 | Fujii | |
| 2003/0148096 A1 * | 8/2003 | Groten et al. | 428/359 |
| 2003/0220034 A1 * | 11/2003 | Ochs | 442/76 |
| 2004/0121691 A1 * | 6/2004 | Klein | 442/389 |
| 2004/0248490 A1 * | 12/2004 | Hyuga et al. | 442/327 |
| 2006/0151222 A1 * | 7/2006 | Tinti | 180/69.22 |
| 2006/0201741 A1 * | 9/2006 | Inoue et al. | 181/204 |
| 2006/0214474 A1 * | 9/2006 | Omiya et al. | 296/198 |
| 2008/0067002 A1 * | 3/2008 | Pfaffelhuber et al. | 181/290 |
| 2009/0085378 A1 * | 4/2009 | Borchardt et al. | 296/191 |
| 2009/0173569 A1 * | 7/2009 | Levit et al. | 181/286 |

FOREIGN PATENT DOCUMENTS

| | | |
|---|---|---|
| EP | 0229977 | 10/1991 |
| EP | 1847383 A1 * | 10/2007 |
| FR | 2387822 | 11/1978 |
| JP | 177781 | 10/1983 |
| WO | 9818657 | 5/1998 |
| WO | 9944816 | 9/1999 |
| WO | 0189883 | 11/2001 |
| WO | 02066312 | 8/2002 |
| WO | 2005007458 | 1/2005 |
| WO | 2005023594 | 3/2005 |
| WO | WO 2006122802 A1 * | 11/2006 |

* cited by examiner

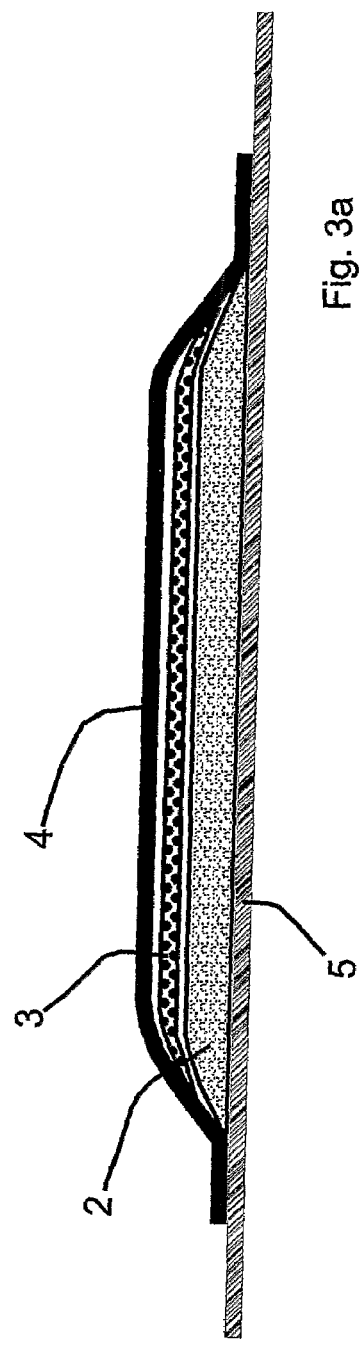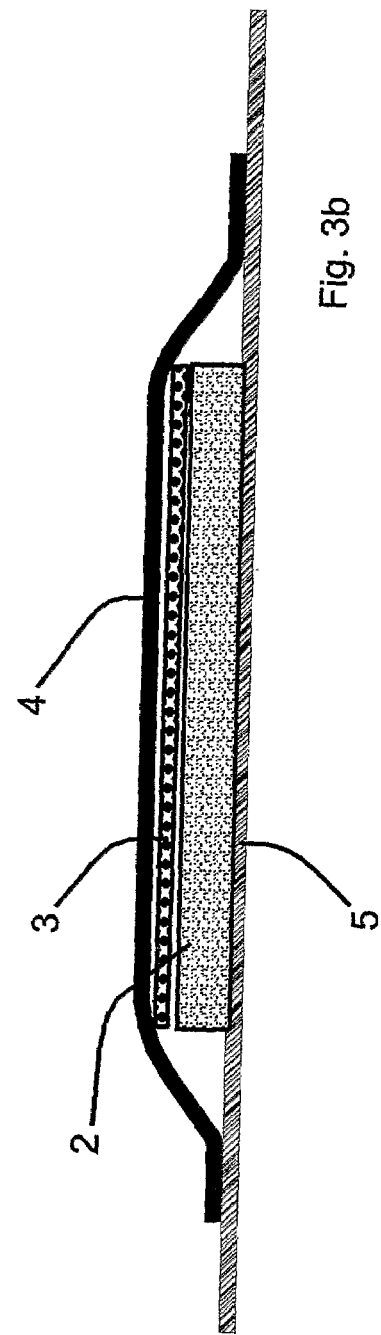

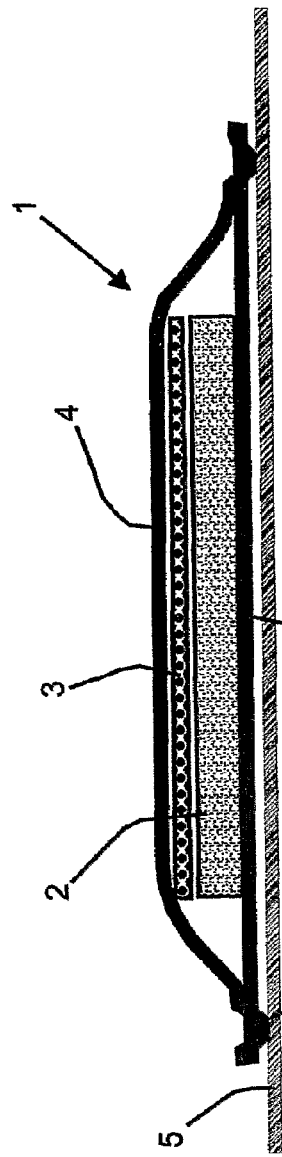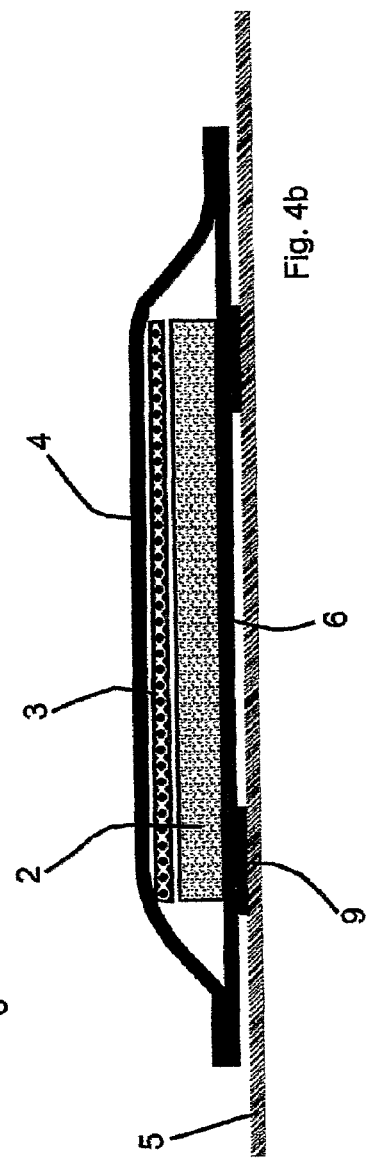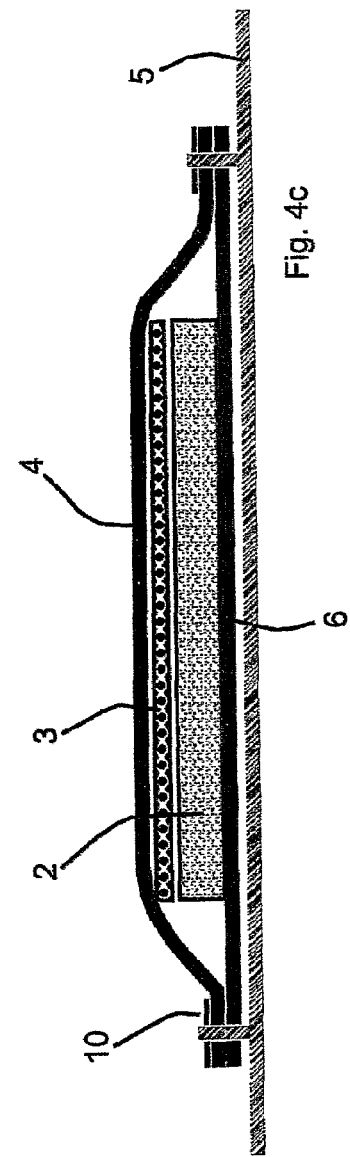

SEALED THIN-MULTI-LAYER SOUND ABSORBER

CROSS REFERENCE TO RELATED APPLICATIONS

This application is a National Stage of PCT/EP2006/0003056 filed Apr. 4, 2006, claiming priority of EP Application No. 05007279.2 filed Apr. 4, 2005, and is incorporated by reference herein in its entirety.

The present invention relates to a multi-layer sound absorber to be fixed on a carrier layer for reducing the exterior and interior noise caused by the engine of an automotive vehicle or its rolling wheels, in particular in the engine and under body regions of the automotive vehicle.

BACKGROUND

Modern car industry is increasingly seeking low-noise vehicles, i.e. vehicles preventing noise to be emitted to the interior or the exterior. For reducing the interior noise caused by the rolling wheels, the wheel housing outer liners and the aerodynamic under floor shields are provided with sound proofing materials. For reducing the exterior and the interior noise caused by the engine, the size and the number of the apertures of the engine compartment are minimized and the amount of absorbing material around the engine is maximized. Because of the presence of dirt, sand, water, snow, salt, ice and liquids like oils, coolant, battery fluid, brake fluid, fuels, washer liquid with anti-freeze and many other contaminating materials, the sound proofing materials located outside the passenger and trunk compartments need to be protected.

As disclosed in EP-0,229,977 it is known to use as a first measurement of protection a hydrophobic and oleo-phobic porous face fabric or a thin foil. This type of protection is sufficient for parts located near to the belt line of the vehicle, typically near to the engine top or the hood, like hood absorbers or water box absorbers, but generally it is not suitable for absorbers used near to the ground, like the under engine shield absorbers, as disclosed in FR-2,387,822, for which imperviousness and a certain ruggedness is required. It is evident for the man skilled in the art of acoustics that such qualities reduce the absorption properties of the absorber.

WO2005/007458 discloses an acoustically effective wheel housing which consists of at least three open pored layers having different air permeability. Unfortunately this kind of absorber sooner or later attracts external agents (dirt or salt in winter, humidity) which destroy the acoustic performance and increase the weight of the whole part.

It is also known to use wear resistant closed celled absorbers, as disclosed in WO02/066312, for manufacturing lightweight and noise reducing wheel housing elements, instead of open celled or fibrous absorbers sealed in a bag. Known closed celled polypropylene foam absorbers, in particular formed as a chamber absorber, as described in WO99/44816 or JP-58177781, are lightweight and possibly low cost but their absorption properties are poor (absorption is rarely above a=0.6), especially if the size of the chambers (height, width or length) is below 20 mm and the chamber walls are becoming too stiff, and little energy being dissipated inside the wall material itself.

Sealed absorbers generally are made of a non-woven felt die cut blank, generally cotton felt with phenolic resin, or alternatively of a slab of open cell PUR foam placed in a bag made of two foils welded together. The absorber is affixed to the under floor shield by fasteners, double sided tape or more generally by high frequency welding points. The acoustic absorption behaviour of a sealed single layer open celled absorber is generally spiky in the frequency domain (absorption peak has a narrow frequency bandwidth) and the maximum of the absorption value a is generally smaller than 0.8.

As known from PCT/CH2004/000572 it is acoustically advantageous to replace the known sealed single layer absorber by a two felt layer structure sealed in a bag. The sealed absorber described in above application comprises a top felt layer which exhibits an air flow resistance of between 300 to 1200 Ns/m$^3$ (air flow resistance may be unambiguously determined using measuring methods as stated in ISO 9053 norm) and a bottom felt layer which has a thickness of between 1 to 20 mm, typically 5 to 10 mm. Both felt layers have an area weight of between 300 to 1200 g/m$^2$. By using this layout a maximum absorption of a=1 could be reached, but more importantly this absorption shows a much wider peak frequency bandwidth. Unfortunately the area weight of the obtained laminate is typically around 1000 g/m$^2$, which is rather heavy especially compared with the above mentioned chamber absorber.

In view of WO01/89883 a further critical parameter is the thickness of the absorber in a bag. A reduction of the thickness of the absorber shifts its maximum absorption frequency $f_o$ to a higher frequency region. If one tries to reduce the thickness of the absorber one takes the risk that the absorption spectrum of the absorber does not correspond anymore to the averaged noise spectrum of the engine or rolling noise, which the absorber was supposed to dissipate. For example a 10 mm thick felt absorber with a 60 g/m$^2$ foil has its maximum absorption peak in the region of about 2500 Hz, while a rolling noise peak is generally generated at around 1000 Hz.

Unfortunately all of the known products for reducing the exterior and the interior noise caused by the engine or the rolling wheels of an automotive vehicle show well recognized limitations and shortcomings. The known noise reducing wheel housing outer liners or under floor shields provide either a poor degree of sound absorption, tend to wear off and degrade over time, are heavy and space consuming, or absorb frequencies in a small bandwidth only. Most of them are difficult and expensive to manufacture.

OBJECTS AND BRIEF SUMMARY OF THE INVENTION

Therefore it is the object of present invention to provide a sound absorber having excellent acoustic performance and broad frequency bandwidth, with significant weight and thickness savings and reduced production costs.

This is achieved according to the invention by a sealed thin multi layer laminate sound absorber having the features of claim 1 and in particular by a sealed dual-layer sound absorber to be mounted on a carrier layer. The sound absorber according to the invention is to be mounted on a carrier layer and comprises at least three layers:

- a first layer, typically a foil having a thickness of 20-100 μm and preferably 40 μm, being impervious to water and having an area weight of 20 to 100 μg/m$^2$, preferably less than 60 g/m$^2$,
- a second layer being porous (preferably open pored) and having a thickness of 0.1-1.5 mm, preferably of less than 1 mm, in particular of 0.1-0.5 mm, and a weight per unit area of from 15-250 g/m$^2$, in particular of 25-150 g/m$^2$, preferably 100 g/m$^2$ and exhibiting an air flow resistance in the range of 250<$R_r$<2500 Ns/m$^3$, preferably 750 Ns/m$^3$,
- a third layer being an open pored non-woven fibre layer or an open cell foam layer and having a thickness of 2-30 mm, preferably of 8 mm, and an area weight of 50 to 1000 g/m², preferably of 250 g/m², whereby the first layer is protecting the other two layers against humidity or any other exterior contamination.

The preferred embodiment has an overall thickness of less than 10 mm and an area weight of less than 500 g/m², while providing an excellent sound absorption at the same time.

This sound absorber exhibits the surprising property that a conventional felt layer with a given air flow resistance of typically 300 to 1200 Ns/m³ and having a weight of typically 500 g/m² and being about 4 mm thick can be replaced by a much lighter (typically 25-100 g/m²) and much thinner (typically 0.1-0.5 mm) layer, as long as the airflow resistance is maintained. This high airflow resistance can only be obtained by choosing very carefully the fineness of the fibres. Alternatively a micro-perforated foil with an appropriate hole diameter and open area ratio may be used for the same purpose.

In the preferred embodiments the first layer is, at least partially, made of polypropylene, polyester, polyamide or any thermoplastic polyolefin, or is made of a thermo set plastic, in particular polyurethane. The second layer comprises meltblown micro-fibres, the fibre fineness of which amounts 0.1-0.5 dtex. The second layer comprises polypropylene, polyester, copolyetherpolyester, polyethylene, polyethylene terephthalate, polybutylene terephthalate or polyamide micro-fibres. The second layer may also be made of a micro-perforated layer, the perforations of which having a diameter or slit length of between 0.1-1.0 mm and generating an open area ratio of between 0.01-5%. The third layer is a non-woven layer of synthetic fibres, in particular polyester fibres or of natural fibres, in particular cotton fibres, or of a mixture of natural and synthetic fibres. The third layer comprises binders, in particular bi-component fibres, thermoplastic fibres, thermoplastic or thermoset resins, or rubber, or a combination thereof; or is a non-woven layer of fibres, which have been interlocked by means of a needling process or by means of water jet treatment. The third layer is a foam layer with a density of 10 to 50 kg/m³ and consists of an open cell foam, in particular polyurethane foam or melamine foam. The second layer has an area weight of 25-150 g/m². It appears to be advantageous for the absorber according to the invention, that the second and third layer, when measured together, have a combined air flow resistance in the range of $400<R_t<3000$ Ns/m³, while the second layer has an air flow resistance in the range of $250<R_t<2500$ Ns/m³, in particular $500<R_t<1000$ Ns/m³. According to the present invention the multi-layer is sealed against liquids and dirt. This is achieved by the encapsulation of the second and the third layers between the first layer and a supportive carrier layer or preferably by a fourth impervious layer facing the third layer. Preferably the laminate is sealed against liquids and dirt on its edges by welding the first layer against the fourth layer on the edges of the laminate. In another preferred embodiment the multi-layer is sealed against liquids and dirt on its edges by welding all the layers together on the edges.

The obtained absorbing multilayer may be fixed to a supporting carrier by means of high frequency welding on points, double sided tape or by separate fasteners. The first, second and third layers may be welded together on the edges of the multilayer against a supportive carrier layer in order to provide sealing against liquids and dirt without the expense of the fourth layer. The laminate may be encapsulated between the first layer and the supportive carrier layer by means of a continuous line of welding along the edges of the first layer. The three layers may be welded together on the edges of the laminate against a supportive carrier layer in order to provide sealing against liquids and dirt.

A further development of the present invention foresees to create individual pockets with the purpose to modify the absorption curve of the multi-layer and to avoid that, in case of a rupture or other damage of the first layer the whole multi-layer (or laminate) is contaminated and its acoustical performance is ruined. This structural design is only possible with sealable materials.

The technical advantages of the present invention are evident for the man skilled in the art and are to be seen in the significant reduction of thickness, reduction of weight, improvement of absorption performance and simple production.

BRIEF DESCRIPTION OF THE DRAWINGS

In the following, preferred embodiments of the invention are described in more detail referring to the Figures, whereby:

FIGS. 3 a, b are schematic views of different structural designs of the multi-layer absorber according to the invention;

FIGS. 4 a, b, c are schematic views of different fixation constructions of a preferred embodiment of the multi-layer absorber according 20 to the invention;

DETAILED DESCRIPTION OF EXEMPLARY EMBODIMENTS

Figure 1:
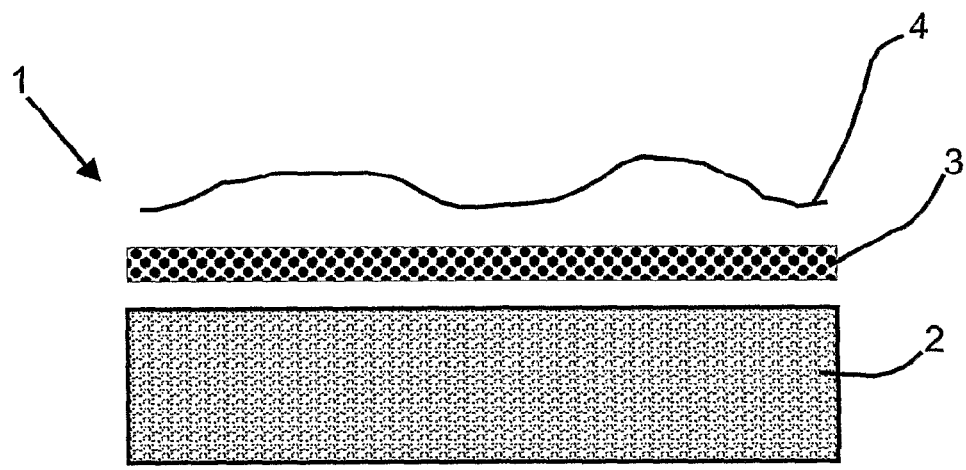
FIG. 1 is a schematic view of a multi-layer absorber according to the invention.

FIG. 1 shows a schematic view of the structural design of the multi-layer absorber 1 according to the invention. This multi-layer absorber comprises a third layer or spacer 2 preferably consisting of a 100% PET felt with bi-component fibres. In a preferred embodiment this spacer 2 is 8 mm thick and has an area weight of about 250 g/m². It is within the scope of normal technical design to vary the thickness of this layer, i.e. in a range of between 4 and 12 mm, and to simultaneously vary the area weight or the density in order to achieve optimal acoustic properties. As well the fibres diameter and length may be optimized. The fibres of the preferred embodiment have a finesse of 5 dtex. It is understood that this acoustic spacer 2 may consist of an open celled foam material of thermoset plastics, in particular of polyurethane or melamine.

A thin and porous second layer 3 is arranged on top of this spacer 2. This second layer 3 consists preferably of a PP non-woven of approximately 50 g/m². It is essential for the invention that this porous (open pored) second layer 3 has a high air flow resistance value $R_t$. For the preferred embodiment an airflow resistance Rt of about 600 Nsm⁻³ is used. This so called AFR layer has in accordance with the invention a thickness of less than 1 mm. Preferably this non-woven comprises micro-fibres consisting of polypropylene, polyester, copolyether-polyester, polyethylene, polyethylene terephthalate, polybutylene terephthalate or polyamide.

On top of this AFR-layer 3 there is arranged a thin foil 4 preferably made of PP. This kind of foil has a conventional thickness of about 50 gm and an area weight of less than 50 g/m².

A further embodiment of the above described thin layer multi-layer absorber 1 further comprises a bottom foil (not shown) adjacent the spacer 2. This bottom foil has preferably an area weight of less than 50 g/m² and is either directly sealed with the top foil 4 or sealed together with all other layers of the multi-layer absorber 1 in order to protect the open pored layers 2,3 from any contamination.

Figure 2:
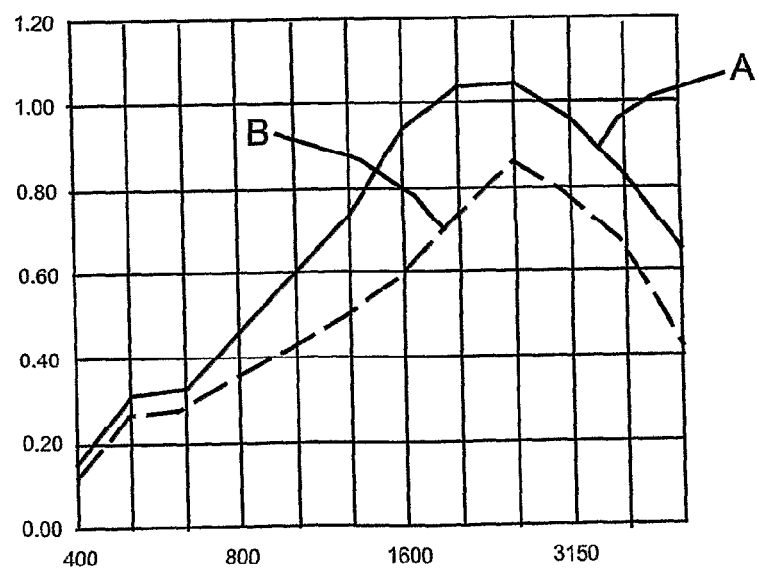
FIG. 2 is a diagram disclosing the acoustic performance of the multi-layer absorber according to the invention.

FIG. 2 shows the diagram comparing the acoustic performance (absorption) of the multi-layer absorber 1 (curve A) with a conventional sealed absorber (curve B) comprising a felt spacer encapsulated in a foil bag. As is clearly recognisable from this diagram the sound absorber according to the invention has an increased absorptive capability over the whole frequency range from 500 to 5000 Hz, although this sound absorber 1 is 50% thinner and 25% lighter than the conventional one.

FIGS. 3a and 3b show different embodiments of the present invention. According to FIG. 3a the top layer 4 (first layer) exceeds the porous layers 3, 2 and is welded to a supportive carrier layer 5. The supportive carrier 5 is preferably but not exclusively an under engine shield, an aerodynamic under floor shield, a wheel housing outer liner shield or a top engine cover. Therewith the thin second layer 2 and the spacer 3 are protected against humidity or any other exterior contamination. Depending on the materials used for the open pored layers 2, 3 the complete thin layer multi-layer 1 may be welded to the supportive carrier layer 5, i.e. all individual layers are welded together, in order to achieve a water tight seal, as shown in FIG. 3b.

FIGS. 4a-4c show schematical views of different constructions for affixing a further embodiment of the multi-layer absorber 1 to the supportive carrier layer 5. This embodiment comprises a bottom foil 6 in order to encapsulate the porous layers 2, 3. The sealing of the absorber is achieved by welding the top foil 4 to the back foil 6 or advantageously by welding all the layers together in order to do without the pre-cutting stage of the layers 2 and 3. For both mentioned embodiments the thin layer multi-layer absorber may be mounted to the supportive carrier 5 by high frequency welding points 8, double sided tape 9 or separate fasteners 10 as illustrated in FIGS. 4a-4c.

Figure 5:
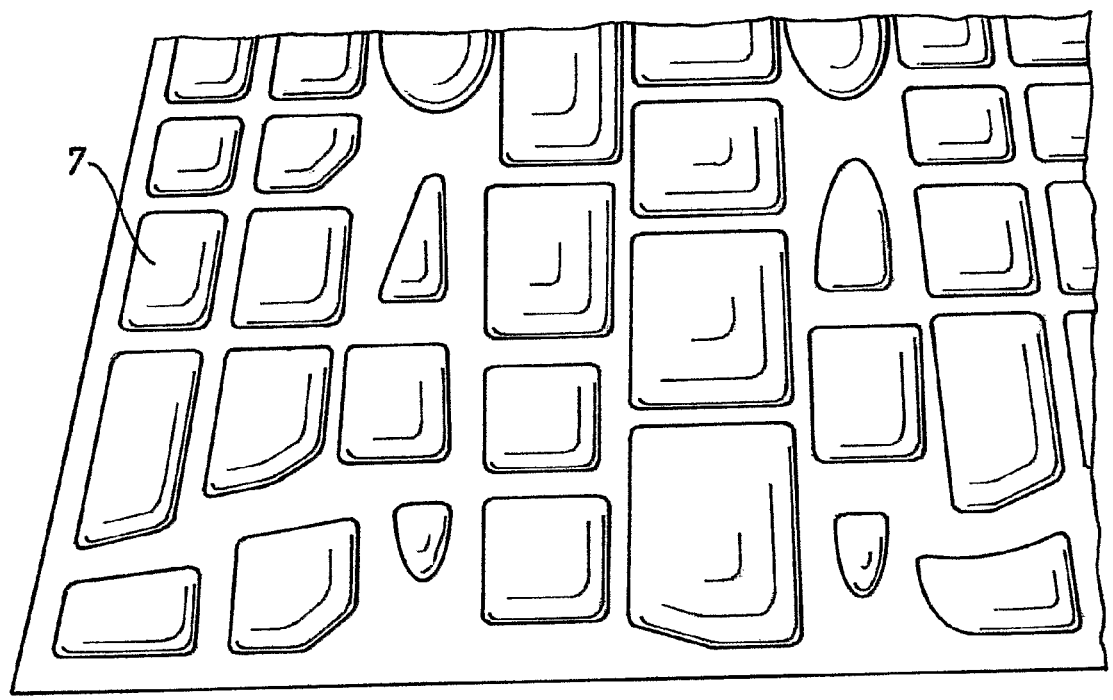
FIG. 5 is a three dimensional view of a further development of the multi-layer absorber according to the invention.

FIG. 5 shows a three dimensional view of a further development of the multi-layer absorber 1 according to the invention. This development comprises a plurality of individual pockets 7 enclosing at least a porous acoustic spacer made of fibrous material (PET material) and a porous thin AFR-layer according to the invention and made of a micro-fibre felt (PP material). The individual pockets have a thickness of about 7 to 20 mm.

Figure 6:
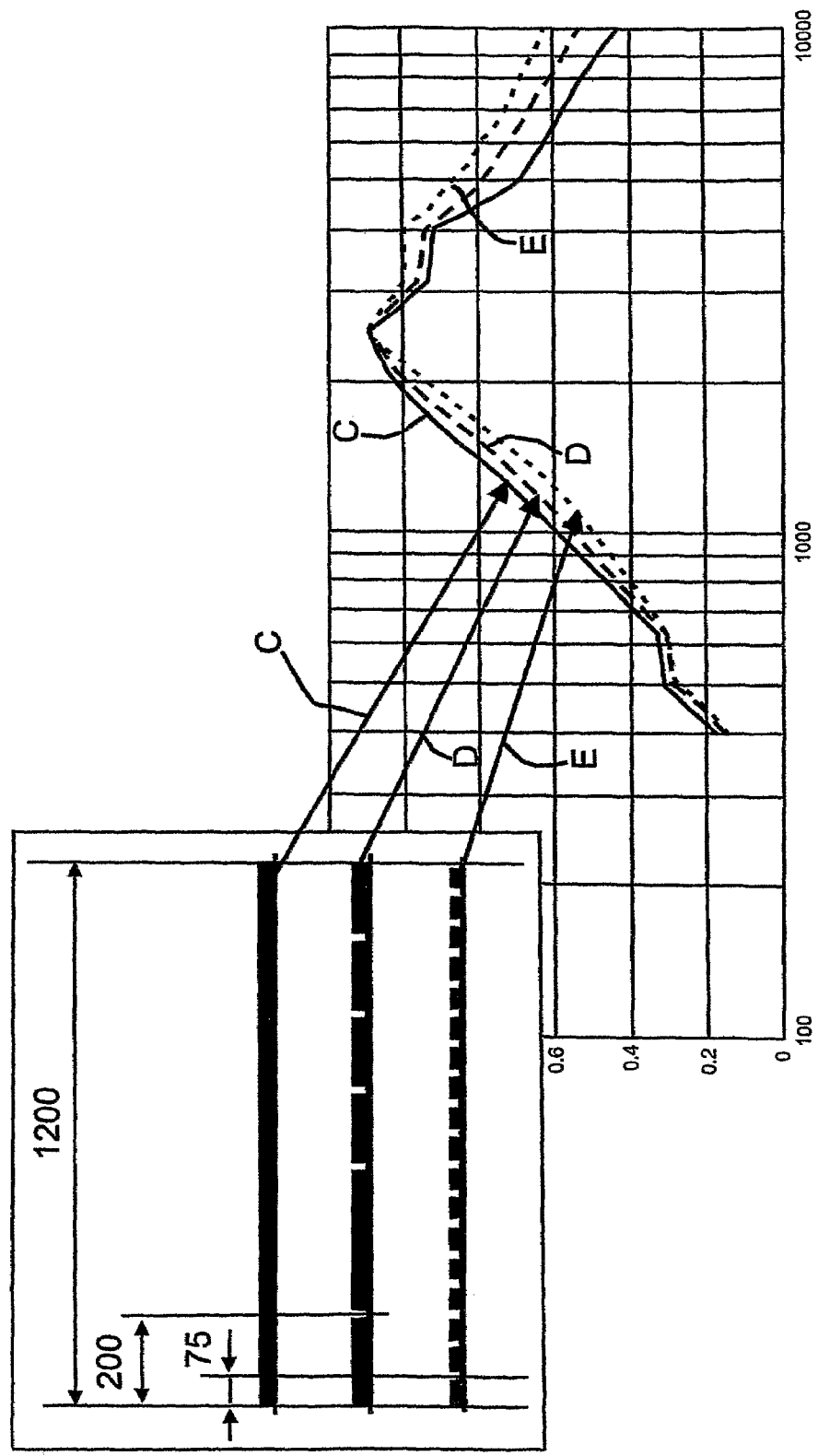
FIG. 6 is a diagram representing the frequency dependant absorption of the multi-layer absorber according to FIG. 5.

FIG. 6 shows the acoustic effect of the pocket size of the sound absorber according to the invention. Curve C within the shown diagram represents the absorptive behaviour of an inventive sound absorber without any pockets. Curve D shows the absorptive properties of an inventive sound absorber with pockets having a width of 200 mm, while curve E represents the absorptive behaviour of an inventive sound absorber with pockets having a width of 75 mm. It becomes evident from this diagram that the size of the pockets shifts the absorption capability to higher or lower frequencies but does not influence the over-all performance.

The technical advantage of the present absorber comprising a sound absorbing thin multi-layer composition is to be seen in the significant reduction of thickness, the reduction of weight, improvement of the absorption performance, and reduction of production costs.

The invention claimed is:

1. A multi-layer sound absorber to be mounted on a carrier layer or a frame for reducing the exterior and interior noise caused by the engine of an automotive vehicle or by its rolling/rotating wheels, whether in the engine region or the under body regions or the wet area of doors of automotive vehicles, comprising:
   a first layer being impervious to contaminations and having an area weight of 20-100 g/m²,
   a second layer being open pored or open celled, and exhibiting an air flow resistant $R_f$ in the range of $250<R_f<2500$ Ns/m³, the second layer having a thickness of less than one millimeter and a weight per unit area of 15-250 g/m²,
   a third layer being porous and consisting of one of an open pored non-woven fibre layer and an open celled foam layer and having a thickness of 2-30 mm and an area weight of 50 to 1000 g/m², the first layer surrounding and sealing the other two layers against any exterior contamination.

2. Sound absorber according to claim 1, wherein the second layer has an air flow resistance in the range of $400<R_f<1500$ Ns/m³.

3. Sound absorber according to claim 1 wherein the second layer comprises micro-fibres, the fibre fineness of which amounts to 0.1-0.5 dtex.

4. Sound absorber according to claim 3, wherein the micro-fibres are made of polypropylene, polyester, copolyether-polyester, polyethylene, polyethylene terephthalate, polybutylene terephthalate or polyamide.

5. Sound absorber according to claim 1, wherein the second layer has an area weight of 50-100 g/m².

6. Sound absorber according to claim 1, wherein the second layer is a micro-perforated layer, the perforations of which having an opening size of 0.1-mm and generate an open area ration of 0.01-5%.

7. Sound absorber according to claim 1, wherein the third layer is anon-woven layer comprising synthetic fibres, in particular polyester fibres, or natural fibres, in particular cotton fibres, or a mixture of natural and synthetic fibres.

8. Sound absorber according to claim 7, wherein the third layer comprises binders, in particular made of bi-component fibres, thermoplastic fibres, thermoplastic or thermoset resins, rubber or a combination thereof.

9. Sound absorber according to claim 1, wherein the third layer consists of a foam layer with a density of 10 to 50 kg/m³.

10. Sound absorber according to claim 9, wherein the third layer consists of an open celled foam made of one of polyurethane and melamine.

11. A sound absorber according to claim 1, wherein the second and third layer, when measured together, have a combined air flow resistance in the range of $400<R_f<3000$ Ns/m³.

12. Sound absorber according to claim 1, wherein the first layer is made, at least partially, of polypropylene, polyester, polyamide, thermoplastic olefin, or any other thermoplastic material, or is made at least partially of a thermoset plastic, in particular polyurethane.

13. Sound absorber according to claim 1 wherein the absorber comprises a fourth layer facing the third layer and being impervious to contamination.

14. Sound absorber according to claim 13, wherein the absorber is sealed by welding the first layer with the fourth layer along their edges.

15. Sound absorber according to claim 13, wherein the absorber is sealed by welding all the layers together along their edges.

16. Sound absorber according to claim 1 wherein the absorber is affixed to a supporting carrier by means of high frequency welding.

17. Sound absorber according to claim 1 wherein the absorber is affixed to a supporting carrier by means of a double sided tape.

18. Sound absorber according to claim 1 wherein the absorber is affixed to a supporting carrier by means of separate fasteners.

19. Sound absorber according to claim 1 wherein at least the first layer is welded to the supporting carrier layer in order to provide fixation and sealing against any contamination of the second and the third layer.

20. Sound absorber according to claim 1 wherein at least the first, the second and the third layer are welded together to the supportive carrier layer in order to provide a fixation and sealing against any contamination to the second and the third layer.

21. Sound absorber according to claim 1 wherein the absorber comprises a plurality of individually sealed pockets.

22. Sound absorber according to claim 7, wherein the third layer is made of a non-woven layer of fibres which are interlocked by means of a needling process or by means of a water jet treatment.

* * * * *